(No Model.)　　　　　　　　　　　　　　　　　　　　　4 Sheets—Sheet 1.
J. F. HANSCOM.
MACHINE FOR MAKING STAPLES.
No. 322,372.　　　　　　　　　　　Patented July 14, 1885.
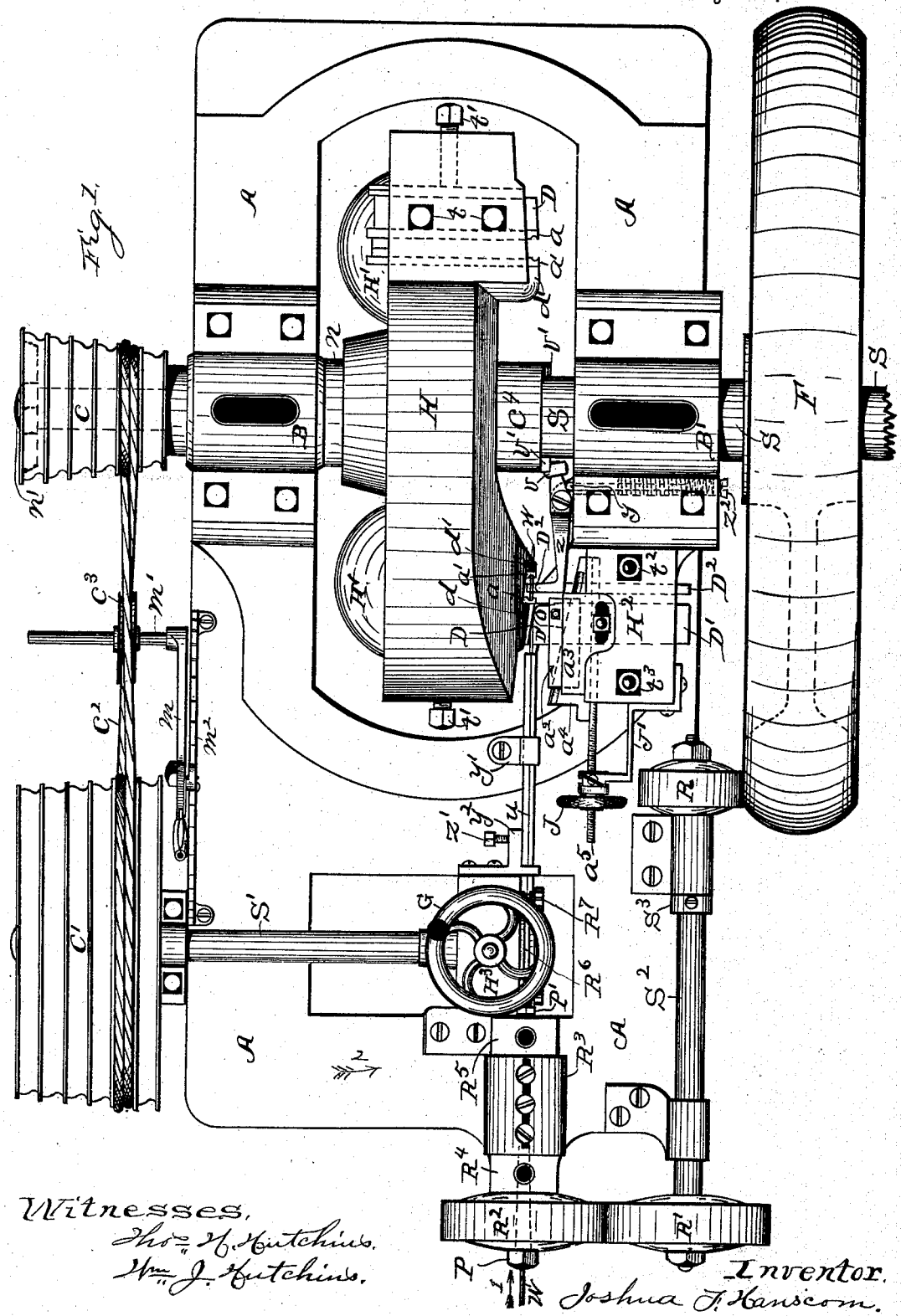
Witnesses.
Thos. H. Hutchins.
Wm. J. Hutchins.
Inventor.
Joshua F. Hanscom.

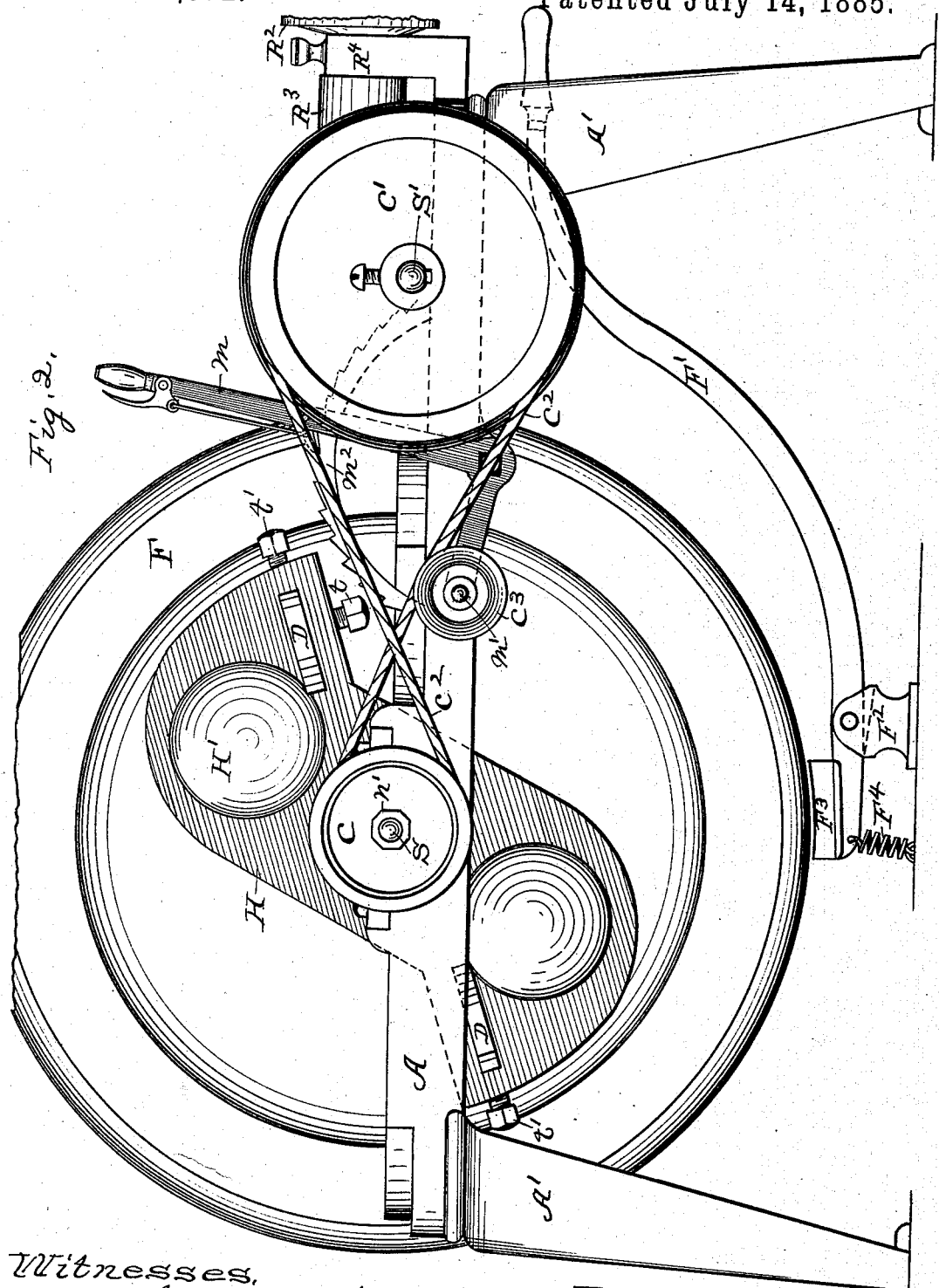

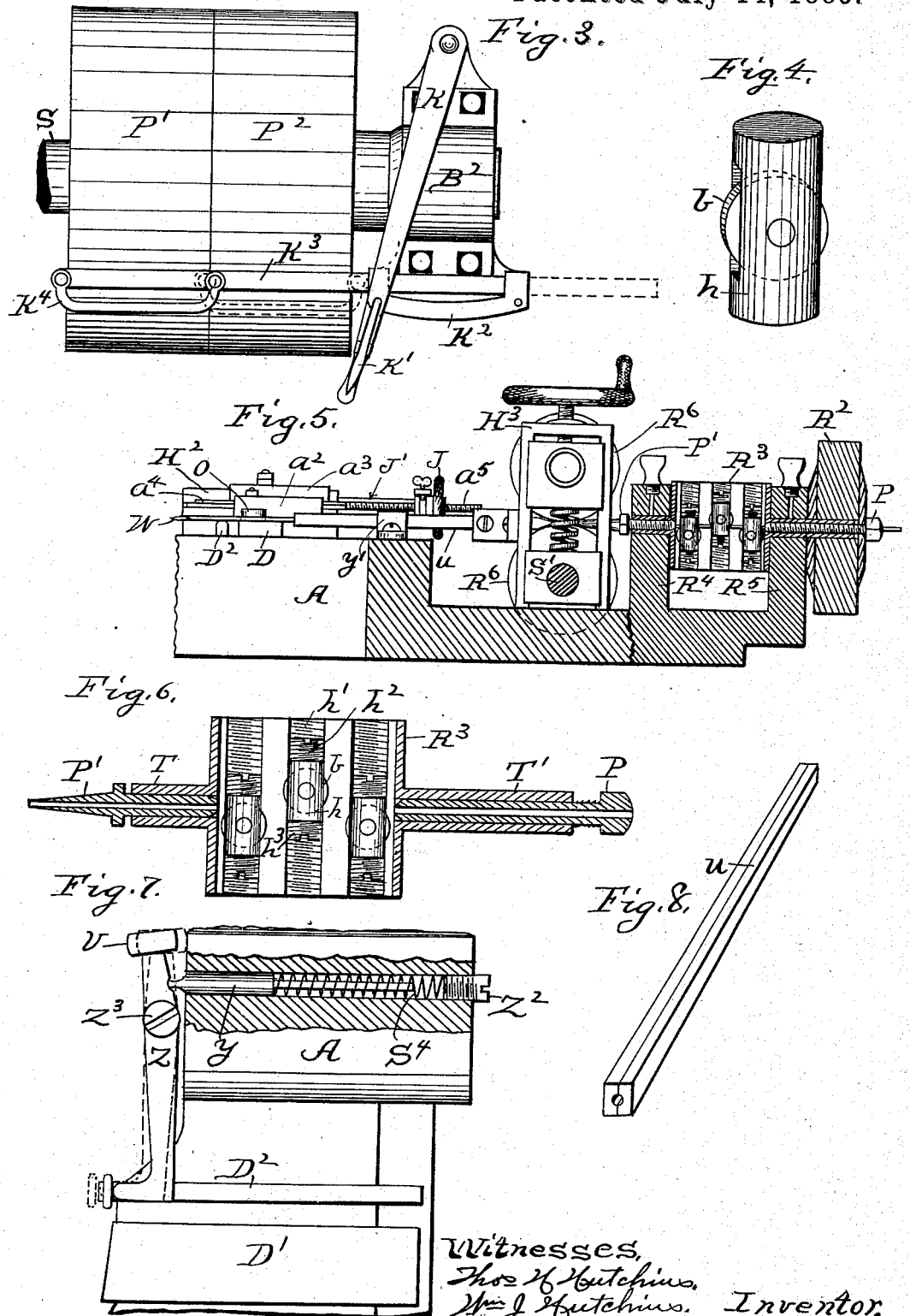

(No Model.) 4 Sheets—Sheet 4.

J. F. HANSCOM.
MACHINE FOR MAKING STAPLES.

No. 322,372. Patented July 14, 1885.

Witnesses,
Thos. H. Hutchins,
Wm. J. Hutchins,

Inventor,
Joshua F. Hanscom.

N. PETERS, Photo-Lithographer, Washington, D. C.

UNITED STATES PATENT OFFICE.

JOSHUA F. HANSCOM, OF JOLIET, ILLINOIS, ASSIGNOR OF ONE-HALF TO THE ASHLEY WIRE COMPANY, OF SAME PLACE.

MACHINE FOR MAKING STAPLES.

SPECIFICATION forming part of Letters Patent No. 322,372, dated July 14, 1885.

Application filed February 7, 1885. (No model.)

*To all whom it may concern:*

Be it known that I, JOSHUA F. HANSCOM, a citizen of the United States of America, residing at Joliet, in the county of Will and State of Illinois, have invented certain new and useful Improvements in Staple-Machines, of which the following is a specification, reference being had therein to the accompanying drawings.

This invention relates to certain improvements in staple-machines for cutting and forming staples for fence and other purposes from wire strands fed continuously into the machine, which improvements and their construction and operation I will proceed to explain in the following specification and claims.

Figure 9:
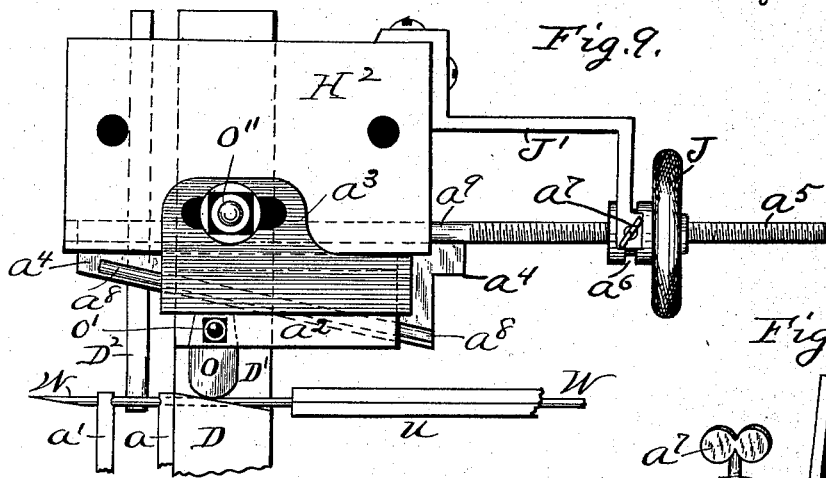
Figure 10:
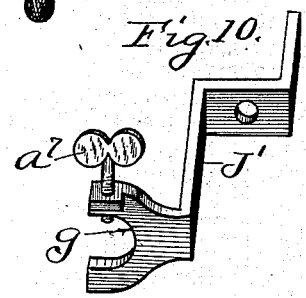
Figure 11:
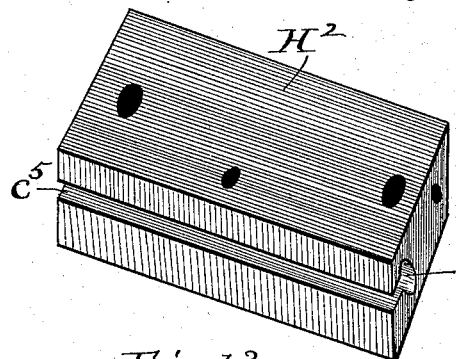
Figure 12:
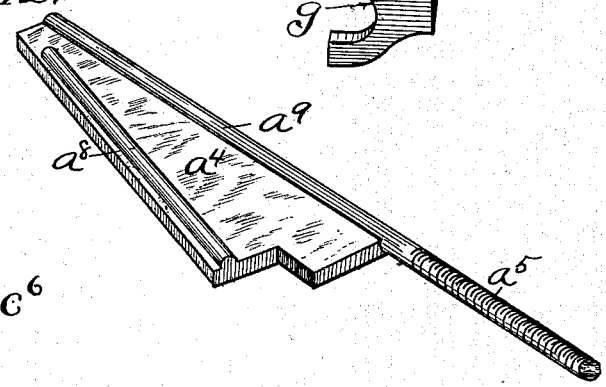
Figure 13:
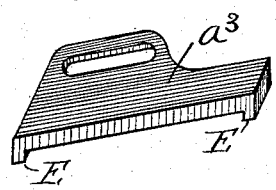
Figures 14, 15:
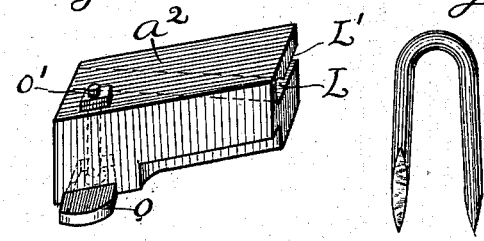

Referring to the drawings, Figure 1 is a top plan view of the machine. Fig. 2 is a side elevation. Fig. 3 is a plan view of a tight and loose pulley and their belt-shifting mechanism, it being a broken-away portion of Fig. 1, and its shaft being a portion of the main shaft of the machine, to which tight pulley power is applied to drive the machine. Fig. 4 is a perspective view of one of the blocks having one of the wire-straightening sheaves. Fig. 5 is a section of a portion of the bed of the machine, and a vertical longitudinal section of the wire-straightening mechanism on line of arrow 1, Fig. 1, and a side view of the feed-rollers and their supporting-stand, of the wire-guides, and of the cutting-die and bending-pin and their contiguous parts. Fig. 6 is a central vertical longitudinal section of the wire-straightening device and its journals, and also of its bushings, and a plan view of three sheave-blocks and their sheave-wheels, showing the manner in which they are adjustably held within the wire-straightening head by means of adjusting-screws, one engaging each end of said sheave-blocks within the screw-threaded chambers containing said blocks; Fig. 7, a top plan view of a broken-away portion of the machine-bed, showing the wire-cutting die, the bending-pin, and the staple-discharger, a portion of the bed being broken away to show a spring-plunger for engaging the staple-discharger, to hold it in its proper position when not discharging staples. Fig. 8 is a perspective view of a pair of wire-guides for conducting the wire to the cutters. Fig. 9 is a plan view of the cutting and bending dies, and also of the mechanism for adjusting the wire between the cutters, to regulate the length of the prods of the staple, so that each prod may be of equal length. Fig. 10 is a perspective view of a forked arm having a thumb-screw arranged in one of its extending forks, it being a portion of the wire-adjusting mechanism. Fig. 11 is a perspective view of the stationary head-block of the wire-adjusting mechanism. Fig. 12 is a perspective view of a wedge-shaped plate having ribs formed thereon at each edge, and having an extending screw-threaded stem, it being a portion of the wire-adjusting mechanism. Fig. 13 is a perspective view of a guiding cap-plate of the wire-adjusting mechanism. Fig. 14 is a perspective view of a sliding head-block having a die attached thereto for engaging the wire, it being a portion of the wire-adjusting mechanism; and Fig. 15 is a perspective view of a wire staple, it being the finished product of the machine.

A represents the body, frame, or bed of the machine, mounted on legs A', and is arranged to support the working parts of the machine.

S is the main drive-shaft of the machine, and is boxed to the bed A, at either side of said bed, in boxes B B', Fig. 1, and to a side supporting-stand in box B². (See Fig. 3.) Upon this shaft is placed the tight drive-pulley P', loose pulley P², balance-wheel F, at one side of the machine-bed, the cone-pulley C at the opposite side of the machine-bed, and the cutter-head H at the center, between the boxes B B'. A collar, $n$, shrunk on said shaft bears against the inner side of box B, and cone-pulley C bears against the outer side of said box, and is securely held in such position by nut $n'$, which screws on the outer end of shaft S, against cone C. Thus the said shaft is thoroughly prevented from being moved endwise in either direction and unfit the parts placed on it from operation, as hereinafter described.

The cutter-head H, which is shown in Figs. 1 and 2, is arranged to hold two sets of staple-cutters, D D, and benders $a$ $a'$, in suitable chambers, so that their cutting and bending ends project slightly from one side of said head, and are securely held therein by the set-screws $t\,t'$. The weights $H'$ of head $H$ are for the purpose of causing it to run steadily and maintain its force and momentum.

The cutters $D\,D$ and bending-pins $a\,a'\,a\,a'$ are set to work in conjunction with the cutting-die $D'$ and bending-pin $D^2$, which are set in bed $A$ and securely held down in place by the head-block $H^2$ by means of bolts $t^2\,t^3$. (See Fig. 1.)

The wire $W$, from which staples are to be cut, is fed into the machine at one end, as shown in Figs. 1 and 5, first through a bushing, $P$, thence between the sheave wheels or rolls $b$ of the revolving straightening-head $R^3$, (see Fig. 5,) thence through the bushing $P'$, thence between the two feed-rolls $R^6$, and thence between and through a pair of grooved guides, $U$, which conduct the wire between the cutters $D\,D'$ and over the bending-pin $D^2$. (See Figs. 1, 5, and 9.)

The feed-rolls $R^6$, which propel the wire $W$ into the machine, are rotated continuously by means of cone-pulley $C$ on drive-shaft $S$, through the medium of belt $C^2$, cone-pulley $C'$, and shaft $S'$, the lower feed-roll being keyed to shaft $S'$.

The cutting ends of the wire-cutters $D$ and $D'$ are formed at an angle with the line of the wire, and are set to shear closely past each other in such manner as to cut the wire $W$ diagonally to produce long sharp prods, as shown in Fig. 9. At the instant the wire is thus cut the cut off piece, which has thus been pointed at each end, is caught by the benders $a\,a'$, which bend each prod down, one on either side of the bending-pin $D^2$, leaving the staple formed and resting on the end of said bending-pin, as shown in Fig. 1. When a staple has thus been formed, it is immediately discharged, to be out of the way of the next staple to be formed, by means of the discharger $Z$, (see Figs. 1 and 7,) in the following manner: This discharger consists of the lever $Z$, which is pivoted near one end to an integral stud of bed $A$, near shaft $S$, and has on its end next said shaft a friction-roller, $V$, while its opposite end terminates in a finger at right angles to its body part, which finger rests on the upper side of the bending-pin $D^2$, near its end, where the staple is bent, and immediately behind the staple, and is held in such position by means of the spring-plunger $y$, bearing against the roller end of said discharger, as shown in Fig. 1.

$C^4$ is a cam-wheel keyed to shaft $S$ so as to stand at the side of roller $V$ on said discharger-lever, so as to engage therewith to operate the said discharger $Z$, so its end lying on the bending-pin $D^2$ will move toward the end of said pin, as shown by dotted lines in Fig. 7, to press against the staple after it is cut and formed to discharge it from said pin. After the cam $C^4$ has thus caused the discharger $Z$ to throw the staple off the bending-pin, as stated, the coil-spring plunger $S^4$ returns it to its normal position, ready to discharge the next succeeding finished staple.

As the cutter-head $H$ is provided with two sets of cutters, two staples are formed at each revolution of said head.

The plunger $y$ is set in a chamber in bed $A$, immediately under box $B'$, and is operated by coil-spring $S^4$, which is held in proper position and given proper resiliency by means of the screw-plug $Z^2$. (See Fig. 7, and dotted lines in Fig. 1.)

The mechanism for regulating the wire at the point where it lies between the cutters $D\,D'$, to govern the length of the prods, and prevent one prod from being made longer than the other, is shown attached to the machine-bed in Fig. 1 and separated from the machine-bed in Fig. 9, and its several parts shown in detail in perspective in Figs. 10, 11, 12, 13, and 14, and it consists of a stationary head-block, $H^2$, having the chamber $C^6$ and slot $C^5$; a sliding head-block, $a^2$, having a die, $o$, set therein and securely bolted thereto by means of the bolt $o'$, and having the slot $L'$ and chamber $L$ extending through it diagonally, (see dotted lines, Figs. 9 and 14;) of a guide cap-plate, $a^3$, having downwardly-extending flanges $E$ and a slot for adjustably attaching it to head-block $H^2$; of a wedge-shaped sliding plate, $a^4$, having ribs $a^8$ and $a^9$ and an extending screw-threaded stem, $a^5$, (see Fig. 12;) of a forked arm, $J$, having an elongated screw-threaded hub and annular groove $a^6$, formed around said hub, which parts are arranged as follows:

The head-block $H^2$ is stationarily attached to the bed $A$ by means of the screw-bolts $t^2\,t^3$ immediately over the cutting-die $D$ and bending-pin $D^2$, as stated, with its slotted side facing the cutter-head $H$. The wedge-shaped plate $a^4$ is then united with head $H^2$ by passing its ribbed edge $a^9$ into the chamber $C^6$ of said head in a manner that permits that side of said plate to rest in slot $C^5$. The sliding block $a^2$ is then united with plate $a^4$ by sliding it on said plate so rib $a^8$ will enter chamber $L$ so that side of plate $a^4$ will rest in slot $L'$. The head $a^2$ is then placed so that die $o$ will rest upon cutter $D'$, as shown in Figs. 1 and 9, when the guide cap-plate $a^3$ is secured above it to head $H^2$ by means of bolt $o'$ in such manner that the flanges $E\,E$ (see Fig. 13) will overhang said block at each end of sliding head $a^2$ to hold it from moving endwise.

The plate $a^3$ may be adjusted by means of its slot to permit die $o$ to rest on die $D'$ at any particular place desired.

At one end of the stationary head-block $H^2$ is attached an extending forked arm, $J'$, arranged to have its fork $g$ (see Fig. 10) fork over the hub of hand-wheel $J$ in its annular groove $a^6$, as shown in Fig. 9. This hand-wheel $J$ has its hub screw-threaded, and is placed on the screw-threaded stem $a^5$ of plate $a^4$, and is forked to arm $J'$, as stated, which prevents it from moving along on said stem when turned, but compels plate $a^4$ to slide in either direction, at the will of the operator, by turning the said hand-wheel. When plate $a^4$ is thus caused to slide, it will, by means of its rib $a^8$ passing diagonally through head $a^2$ in chamber L, cause said head and die $o$ to move to or from the stationary head $H^2$ between the flanges E E of cap-plate $a^3$, to adjust die $o$ upon the cutting-die $D'$ to engage with the wire W and hold it at any desired place along between the cutters D D' to govern the exact length of the prods which are to be cut, so the two prods of a staple will be of the same length. Thus the length of the prods to be cut can be easily regulated and determined while the machine is in motion simply by turning said hand-wheel one way or the other until the object is accomplished. A thumb-screw, $a^7$, serves to hold said hand wheel set and prevent its voluntary rotation.

The wire-straightening mechanism is shown in Figs. 1, 5, and 6, and consists in the head $R^3$, having three transverse screw-threaded chambers, $h'$, within which are respectively placed the sheave-blocks $h$, each having a sheave-wheel, $b$, which blocks are adjustably held therein by means of the plug-screws $h^3$, as shown in Figs. 5 and 6. This head $R^3$ is journaled in the standards $R^4 R^5$ so its center will be on a line parallel with the bite of the feed-rolls $R^6$. The journals of head $R^3$ are bored and screw-threaded for the reception of the tubular screw-threaded bushings P P' to receive the wear caused by the passing wire, and to be replaced by new ones when badly worn. Bushing P conducts the wire W to the head $R^3$, and bushing P' conducts it onto the feed-rolls after it has been passed through revolving head $R^3$, between the sheaves $b$, as shown in Fig. 5.

The feed rolls $R^6$ are journaled in suitable boxes, adjustable vertically in the frame $H^3$, as shown in Fig. 5, and are geared together by means of suitable gears, $R^7$. (See Fig. 1.)

The grooved guides U are adjustably supported by means of the box $y'$, which is bolted to bed A, and bracket $y^2$, which is bolted to frame $H^3$. The set-screw $Z'$ serves to hold said guides firmly in said bracket.

The straightening of the wire is accomplished as follows: As the wire is passed through head $R^3$, the sheaves $b$ are set to have enough frictional contact with the wire to roll out any kinks or crooks in the wire. The head $R^3$ is caused to rotate very rapidly by means of the frictional contact of a rubber friction-roller, R, bearing against the flattened side of the balance-wheel F through the medium of shaft $S^2$ and a pair of engaging rubber friction-wheels, $R'$ and $R^2$, as shown in Fig. 1, and the rotation of the head $R^3$ is much more rapid than the speed at which the wire W is fed in. The sheave-wheels $b$ are caused to roll spirally around the wire as it passes them, and thus come in contact with every side of the wire, to straighten any kinks or bends in it from any direction. When it is desired to stop feeding the wire into the machine, the hand-wheel G may be turned so as to relieve its pressure on the sliding box of the upper roll, so the coil-spring under it will separate the rolls slightly to relieve their bite on the wire. The cone-pulleys C and C' are formed in separate graduated step-sections, so that by placing the belt $C^2$ in different sections of the pulleys different speeds may be given the feed-rolls $R^6$, to feed in more or less wire within a given time to make different-lengthed staples. The belt $C^2$ is round, and is passed once entirely around each cone, as shown in Fig. 1, to increase its frictional contact with the pulleys, and is crossed between them to cause them to turn in the right direction. The bell-crank lever $m$ is pivoted at its elbow to the side of bed A and between the cone-pulleys. The lower end of said bell-crank is provided with the sheave wheel $C^3$, to engage with belt $C^2$ to tighten it. A spring pawl on said lever engages with a notched segment, $m^2$, to furnish means for holding said sheave against said belt to tighten or loosen it as much as desired. The form of the belt-surface of the sections of said cone-pulleys is shown in Fig. 1, one half being hollowed and the other half rounded, and are so arranged that the portion of the belt doing the greatest service lies in the hollows of the cones and leaves the cones after it has passed around them from the hollowed portion, and as the belt enters the said sections of the cones it rides up on the rounded parts, and as the strain on it increases it enters the hollowed side of said sections, which change takes place between where the belt enters upon and where it leaves said cones, and by thus constructing the separate sections of the cones all binding or climbing of the belt is prevented.

On the cutting side of the cutter-head H, and immediately back of the cutters D D and benders $a$ and $a'$, are formed projecting lugs $d$ $d'$, (see Fig. 1,) for the purpose of backing up and firmly supporting the cutters and benders.

In this machine the balance wheel is of such great weight, and its momentum is so great, that it becomes necessary to apply a brake, as shown in Fig. 2, to stop the machine quickly. This brake consists of a hand-lever, $F'$, pivoted near its lower end to a standard, $F^2$, which is bolted to the floor under the balance-wheel F. To the lower short end of said lever is secured a wooden block, $F^3$, arranged to be held at a very short distance from said wheel by a coil-spring, $F^4$, one end of which is secured to lever $F'$, and the other end to the floor. Pressure on the handle end of said lever will stretch said spring and cause block $F^3$ to engage with said balance-wheel, and by its frictional contact therewith prevent its rotation.

By the use of the straightening mechanism and the continuous wire guides and bushings it becomes possible to use wire of any length, even very short pieces, as the machine will cut all the wire up to a very short piece into staples, and the particle of wire left would not be noticed in a lot of staples. The next succeeding wire will push the small piece that would otherwise be left forward, so it may all be made into staples, or very nearly so.

By the use of the mechanism for adjusting the wire between the cutters it becomes possible to maintain an equal length of the staple-prods, even if the scale of the wire be changed or varied, as the operator can at will adjust the wire between the cutters without stopping the machine. Thus a great saving of time is gained, and the staples cut are of a better and more uniform quality.

Having thus described my invention, what I claim as new, and desire to secure by Letters Patent, is as follows, to wit:

1. In the machine described, for forming staples, the cutter-head H, having the projections $d$ $d'$ and weights H', and having the cutting-dies D D and bending-pins $a$ $a'$, in combination with the cutting-die D', bending-pin $D^2$, discharger Z, cam $C^4$, and the means, substantially as shown and described, for adjusting the wire W between the cutters, and for straightening and feeding in the wire W, as and for the purpose set forth.

2. In a machine for making staples, the revolving head $R^3$, having straightening sheave-rolls $b$ adjustably set therein, in combination with the bushings P and P', feed-rolls $R^6$, grooved wire-guides U, and the means, substantially as shown and described, for rotating said head and feed-rolls, as and for the purpose set forth.

3. In the machine described, for making staples, the cone-pulleys C and C', formed in separate graduated sections, presenting one concave and one convex belt-surface, and arranged to carry the belt in the manner substantially as and for the purpose set forth.

4. In combination with the drive-shaft S, counter-shaft S', feed-rolls $R^6$, and belt $C^2$, the cone-pulleys C and C', formed in separate graduated sections, as and for the purpose set forth.

5. In the staple-machine described, the combination of the die $o$, with the means, substantially as shown and described, for adjusting said die, as and for the purpose set forth.

6. In a machine for making staples, the die $o$, arranged, substantially as shown and described, to momentarily adjust the wire W between the dies D D', in combination with the cutting-dies D and D' and bending-pins $D^2$ $a$ $a'$, as and for the purpose set forth.

7. In combination with the cutting and bending mechanism of the machine described, the cam $C^4$ and discharger Z, constructed and arranged substantially as and for the purpose set forth.

8. In the machine described, the balance-wheel F, in combination with lever F', having the friction-block $F^3$, supported by standard $F^2$ and connected with spring $F^4$, as and for the purpose set forth.

9. In the machine described, for making staples, the cone-pulleys C and C', formed in separate graduated sections, as shown, in combination with the lever $m$, having a spring-pawl and means for operating the same, extending spindle $m'$ of said lever, notched segment $m^2$, sheave-wheel $C^3$, and belt $C^2$, as and for the purpose set forth.

10. In a machine for making staples, the combination and arrangement of the mechanism, substantially as shown and described, for adjusting the wire W between the cutters D and D', consisting of the stationary head-block $H^2$, sliding head-block $a^2$, wedge-shaped plate $a^4$, guide-plate $a^3$, forked arm J', hand-wheel J, and die $o$, with the cutting-dies D and D' and bending-pins $a$, $a'$, and $D^2$, as set forth.

11. In a machine for making staples, the combination and arrangement of the mechanism, substantially as shown and described, for straightening the wire W as it is being fed in the machine, consisting of the revolving head $R^3$, having straightening-rolls $b$ adjustably set therein, and having the bushings P and P' placed within the journals of said head, friction-wheels R' $R^2$, shaft $S^2$, and friction-wheel R, arranged to be rotated to impart a rotary motion to said head $R^3$ by its frictional contact with balance-wheel F, as and for the purpose set forth.

12. In a machine for making staples, the combination and arrangement of the mechanism, substantially as shown and described, for discharging the finished staples, consisting of the discharger Z, having the friction-roller V or its equivalent, cam $C^4$, having the lugs V' V', and spring-plunger $y$, or its equivalent, with the cutting-dies D D', bending-pins $a$, $a'$, and $D^2$, and die $o$, as set forth.

JOSHUA F. HANSCOM.

Witnesses:
THOMAS MIDDLETON,
WM. J. HUTCHINS.